US012620794B2

(12) United States Patent
Burke et al.

(10) Patent No.: US 12,620,794 B2
(45) Date of Patent: May 5, 2026

(54) ENCLOSURE SYSTEM FOR UNDERGROUND UTILITY CONNECTIONS

(71) Applicant: CHANNELL COMMERCIAL CORPORATION, Temecula, CA (US)

(72) Inventors: Edward J. Burke, Temecula, CA (US); Thomas Edward Burke, Temecula, CA (US)

(73) Assignee: CHANNELL COMMERCIAL CORPORATION, Temecula, CA (US)

( * ) Notice: Subject to any disclaimer, the term of this patent is extended or adjusted under 35 U.S.C. 154(b) by 158 days.

(21) Appl. No.: 18/588,922

(22) Filed: Feb. 27, 2024

(65) Prior Publication Data

US 2025/0273945 A1     Aug. 28, 2025

(51) Int. Cl.
   *H02G 9/10*     (2006.01)
   *E02D 29/14*     (2006.01)
   *G02B 6/50*     (2006.01)
   *H02B 1/50*     (2006.01)
   *H02G 3/04*     (2006.01)

(52) U.S. Cl.
   CPC ........... *H02G 9/10* (2013.01); *E02D 29/1427* (2013.01); *G02B 6/501* (2023.05); *H02B 1/50* (2013.01); *H02G 3/0493* (2013.01)

(58) Field of Classification Search
   None
   See application file for complete search history.

(56) References Cited

U.S. PATENT DOCUMENTS

| | | | | |
|---|---|---|---|---|
| 3,952,908 | A * | 4/1976 | Carson ..................... | H02B 1/06 |
| | | | | 220/831 |
| 4,158,102 | A * | 6/1979 | Bright ...................... | H02G 9/10 |
| | | | | D13/184 |
| 4,365,108 | A * | 12/1982 | Bright ...................... | H05K 5/03 |
| | | | | 52/169.9 |
| 5,401,902 | A * | 3/1995 | Middlebrook ........... | H02G 9/10 |
| | | | | 174/37 |
| 6,362,419 | B1 * | 3/2002 | Gallagher ................ | H02B 1/50 |
| | | | | 174/37 |
| 7,193,151 | B2 * | 3/2007 | Harwood .................. | H02G 9/10 |
| | | | | 174/37 |
| 7,381,888 | B2 | 6/2008 | Burke et al. | |
| 7,385,137 | B2 * | 6/2008 | Burke ...................... | H02G 9/10 |
| | | | | 174/37 |
| 2010/0288523 | A1 * | 11/2010 | Schilling .................. | H02G 9/10 |
| | | | | 92/136 |

* cited by examiner

Primary Examiner — Krystal Robinson
(74) Attorney, Agent, or Firm — Womble Bond Dickinson (US) LLP

(57)     ABSTRACT

An underground electrical utilities vault and distribution enclosure system having a grade level box having an upper opening facing an interior region for containing a below-ground electrical utility cable, a removable lid adapted for mounting to the opening in the grade level vault, and a pedestal housing, the pedestal housing having a vault adapter configured for replacing the removable lid for access to the interior region of the grade level vault that removably mounts in the upper opening, and an cover positioned over the adapter, the adapter and the vault having slidable doors covering openings to provide access to add additional electrical utility cables to the enclosure.

20 Claims, 5 Drawing Sheets

FIG. 5

ENCLOSURE SYSTEM FOR UNDERGROUND UTILITY CONNECTIONS

FIELD OF THE INVENTION

This invention relates to enclosures for buried and underground electrical transmission lines and related electrical devices and contacts. The invention includes a grade level box or vault closed by a lid. The vault is upgradeable by converting to a pedestal housing by including an adaptor for connection to the grade level vault in place of the lid. The adaptor is configured to accept a pedestal cover and provides an above-ground distribution enclosure containing interconnect hardware for making electrical connections to the transmission lines and/or devices contained in the grade level box.

BACKGROUND

Various electrical transmission lines and other equipment used for buried and underground utilities are commonly contained in enclosures that protect the underground wiring cables, fiber taps and splices, service lines, etc. from the environment. Initial construction often requires installation of such a below-ground enclosure, commonly referred to as a grade level box or vault. At a later date, if service is to be provided to the premises, a portion of the lid for the grade level box is removed and connections are made inside an above-ground pedestal housing mounted on a portion of the grade level box. The above-ground connections are protected from the weather but also must be protected from vandalism and tampering. There is also a need to provide a pedestal housing assembly that can be readily installed and opened to facilitate further connections and/or service with minimal time and labor costs.

The present invention is applicable to any system for storing and protecting underground or buried electrical conductors and devices from the environment and for facilitating access to them when making further connections, providing service, making new installations, and the like. The invention is applicable to electrical utilities connections normally using buried or underground lines or connections such as cable TV, data transmission lines, various types of telecommunications, optical fiber connections, commonly referred to as "fiber to the premises," service lines, water meters, electrical power distribution, and other utilities equipment, for example.

Previous vault and pedestal designs included a complex multi-purpose lid assembly for the grade level box adapted to accommodate a later installed pedestal housing used to bring the fiber taps and splices above ground as disclosed in Applicant's U.S. Pat. No. 7,385,137, the disclosure of which is incorporated herein by reference. In one design a removable split cover plate was adapted for mounting to the opening in the grade level box to close off its interior region from the environment. The split cover plate comprised a pedestal mounting section and a cooperating cover section which were joined together to close off the interior of the grade level box. The pedestal mounting section comprised a base, a plug opening in the base for access to the interior of the grade level box, and a plug that removably mounted in the plug opening for closing off the interior of the grade level box. The plug configuration matched the configuration of the base of the pedestal housing cover or a component part of the pedestal housing assembly to be mounted in the plug opening when the plug was removed.

Another version included a removable split cover plate adapted for mounting to the opening in the grade level box. The split cover included a pair of side-by-side cover plates which provided a pedestal mounting section and a cooperating cover section. The cover plates were joined together to close off the interior of the grade level box. A base of the pedestal housing assembly was adapted for interlocking with the access opening and for mounting the pedestal cover to the split cover plate.

In another embodiment, the pedestal housing assembly comprised a collar and a separate pedestal cover. The collar was adapted to interlock with the access opening in the pedestal section of the split cover. The collar carried one or more upright connection devices for making connections with utility lines or contacts contained in the grade level box. The pedestal cover releasably mounted over the upright connection devices and releasably engaged the collar to contain the electrical connections in the above-ground pedestal assembly.

In another embodiment, the pedestal housing assembly included a collar which was formed integrally with a plug base that interlocks in the access opening of the split cover. The collar carried one or more upright connection devices for making connections with the utility lines or contacts contained in the grade level box. The pedestal cover removably mounted over the connection devices to contain them within the interior of the combined cover, collar, and plug base.

Although the split cover provided improved access to the utility cables and lines contained in the grade level box, the need to manufacture and account for complex split lids, plugs, plug bases was expensive to manufacture, maintain in inventory and complicated to install. Another drawback of split cover versions is the inability to add additional or new utility lines to the vault without digging up the entire vault. Consequently, a need exists for an improved upgradeable vault design which is convertible to a pedestal housing which is less complex than previous designs and provides for a solution to add additional utility lines with ease.

SUMMARY OF THE INVENTION

The present invention provides an improved enclosure system for an upgradeable vault design which is convertible to a pedestal housing that simplifies the transition from initial installation by including a vault adaptor for connection to the grade level vault in place of the original lid for the vault. The invention, when compared with prior convertible enclosure systems, reduces the parts required for making the transition by eliminating split vault lids, plugs and plug bases which avoids discarding parts, and reduces time and labor costs in making new installations or changes to existing installations and provides for installation of additional utility lines after initial installation.

One embodiment of the invention comprises an underground utilities enclosure and distribution assembly which includes a grade level box adapted for installation below ground and having an upper opening facing an interior region for containing a below-ground electrical utility connections and is utilized in the power, utility, telecommunications, and broadband markets. The vault has an integral chamber passageway for controlling and organizing customer service connections. Around the upper perimeter of the vault opening are a plurality of non-symmetrical locating slots for the vault adapter interface. The vault adapter has a corresponding plurality of non-symmetrical snap features for connection to the vault. The enclosure includes access doors in both the vault and adapter to permit installation of additional utility lines after initial installation.

The vault adapter interior is accessible from the outside of the adapter through a captive door. The vault adapter can be customized to fit any size vault and any size pedestal covers. The vault adapter includes features to allow for mounting hardware for securing equipment within and features to allow for pedestal cover locking. The pedestal cover has an upper surface that provides to interchangeable identification placards.

These and other aspects of the invention will be more fully understood by referring to the following detailed description and the accompanying drawing.

BRIEF DESCRIPTION OF THE DRAWINGS

FIG. 5 is an exploded perspective detail view of the vault of FIG. 1.

DETAILED DESCRIPTION OF THE INVENTION

Figure 1:
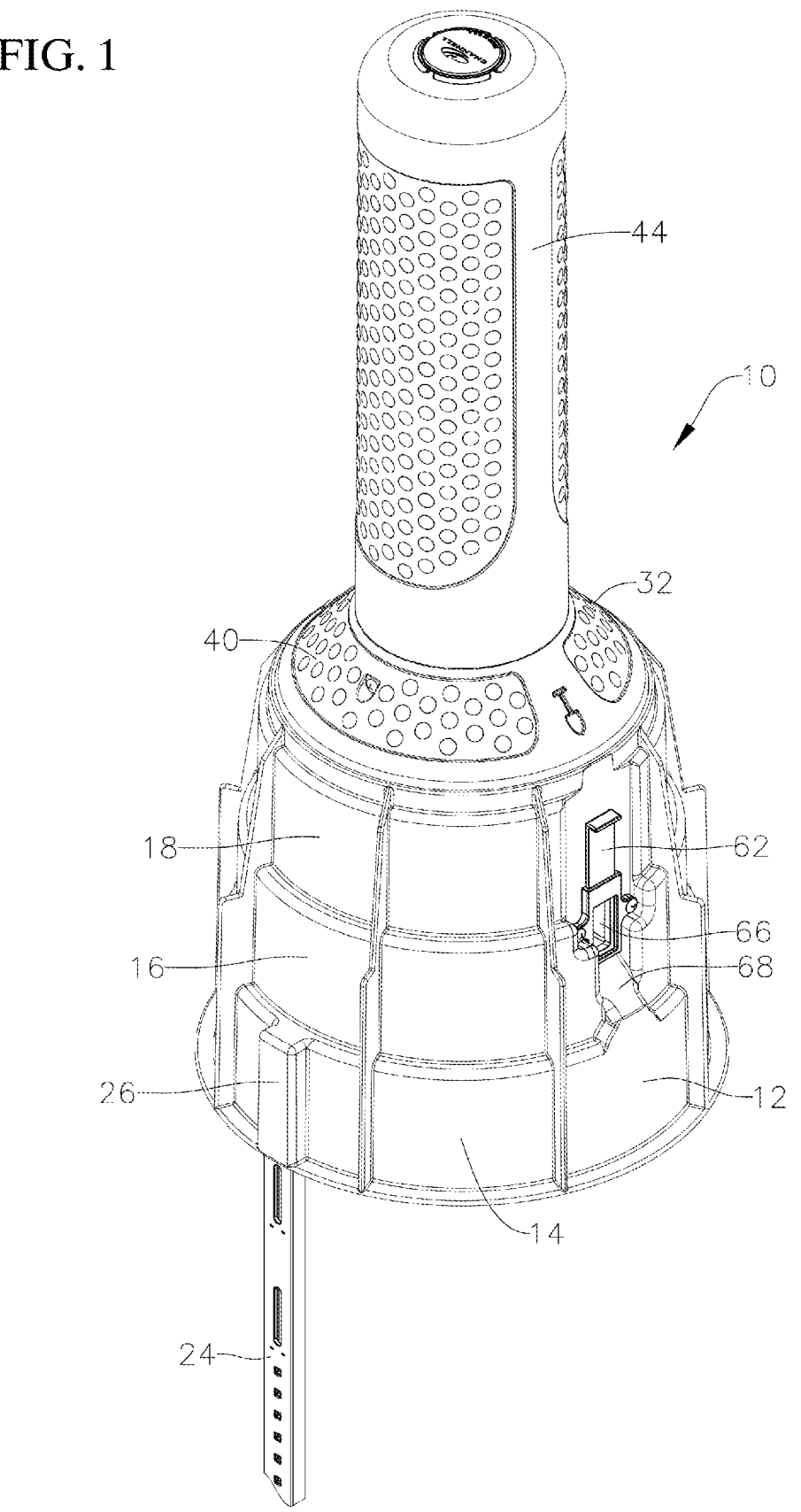
FIG. 1 is a perspective view of one embodiment of an underground electrical utilities enclosure and distribution assembly according to principles of this invention.
Figure 2:
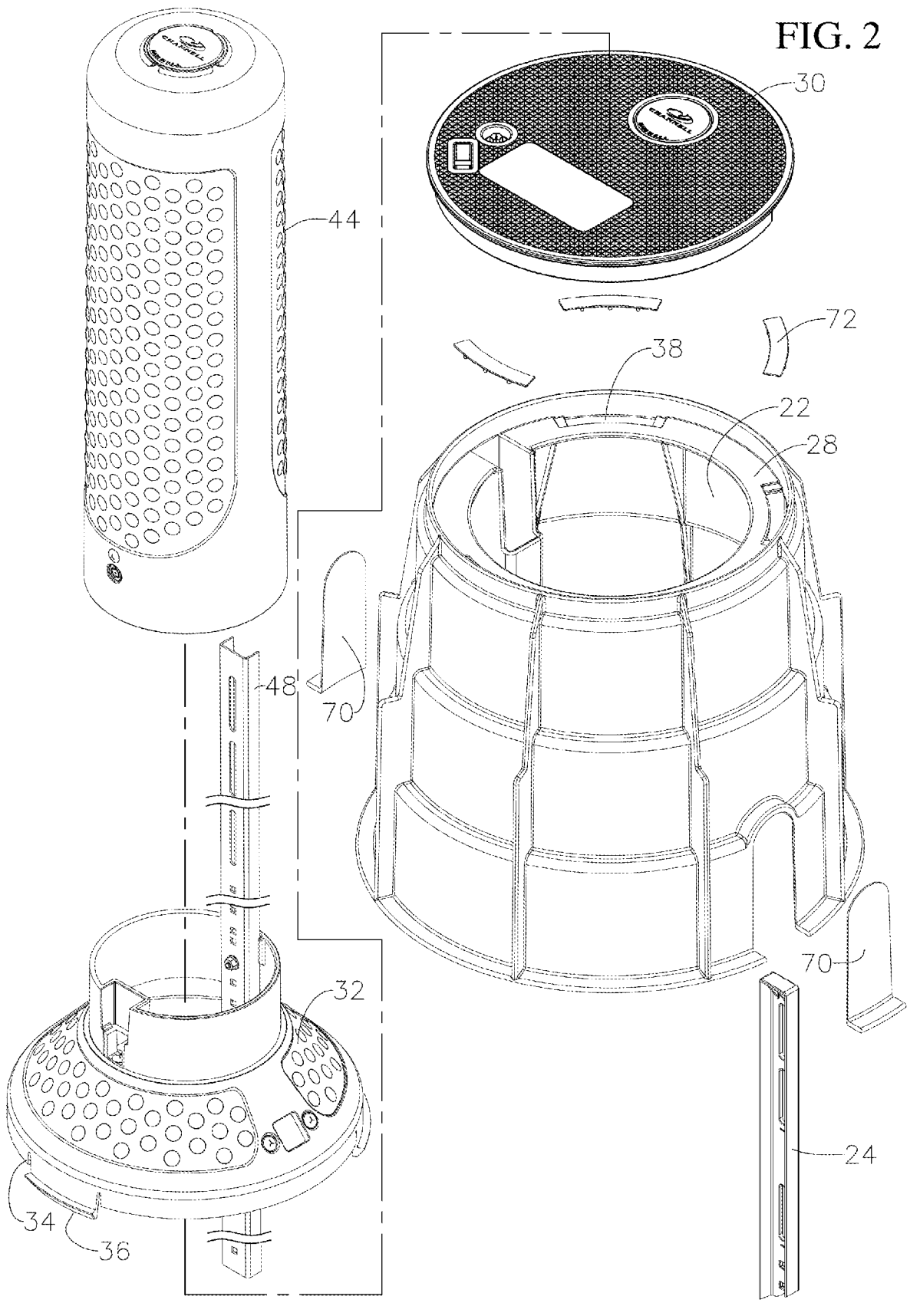
FIG. 2 is an exploded perspective view of FIG. 1.
Figure 3:
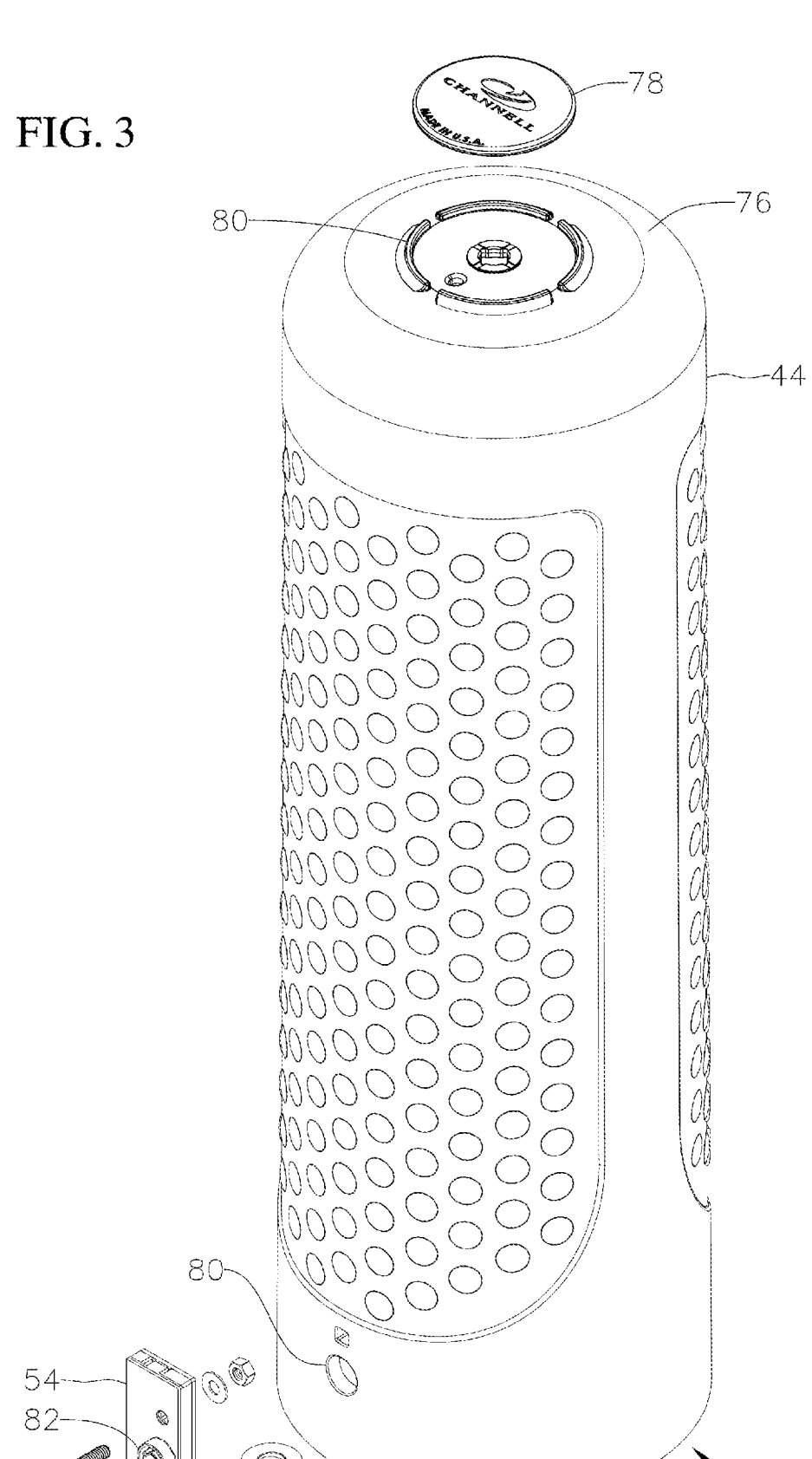
FIG. 3 is an exploded perspective detail view of the pedestal housing of FIG. 1.
Figure 4:
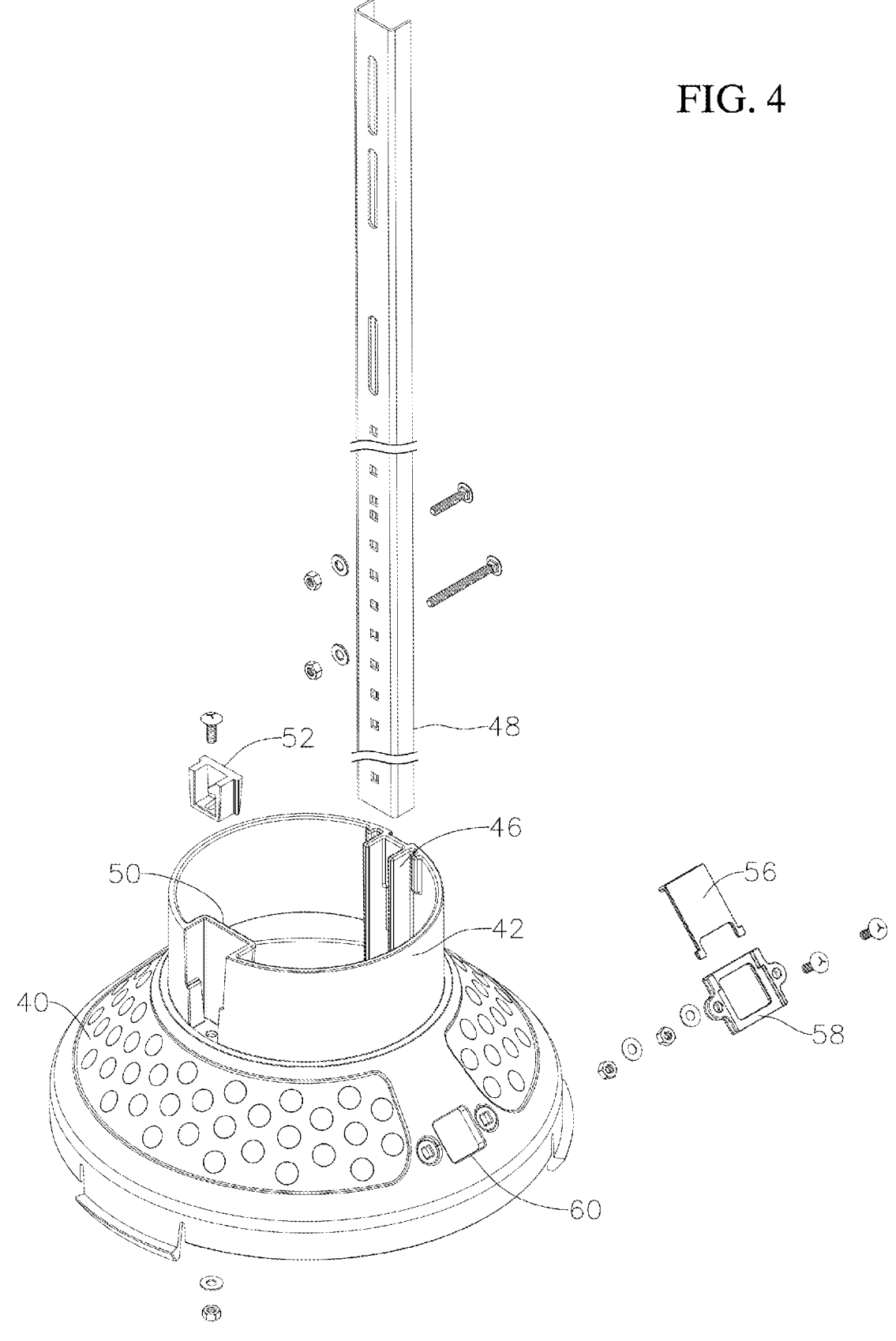
FIG. 4 is an exploded perspective detail view of the adapter of FIG. 1.
Figure 5:
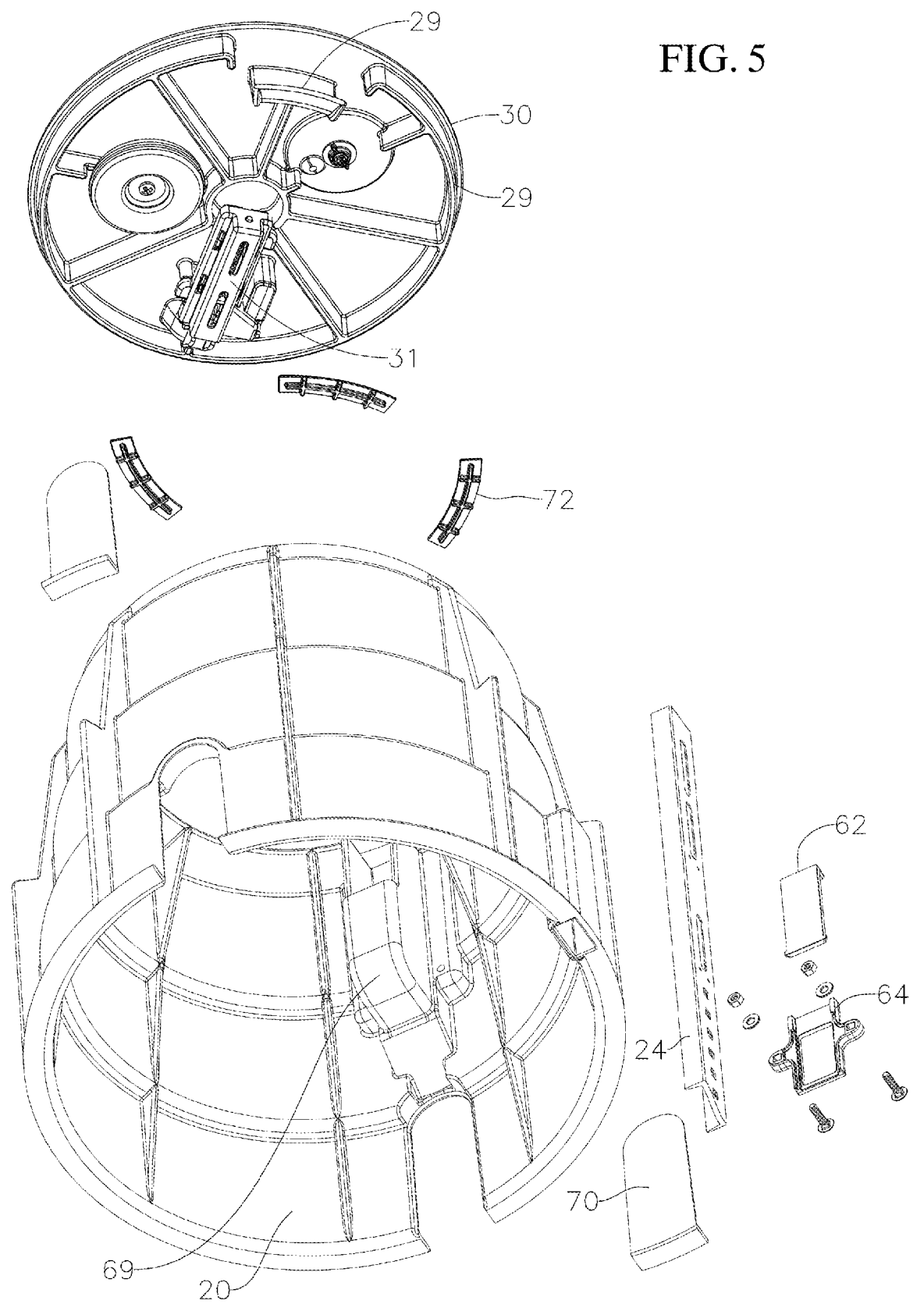

FIGS. 1-5 illustrate one embodiment of a pedestal housing assembly 10 according to principles of this invention. The assembly includes an underground vault 12, also referred to as a grade level box. The grade level box is illustrated as generally circular in configuration, having wall sections 14, 16 and 18 which are successively smaller in diameter thereby being tapered narrower in an upward direction to enclose a hollow interior region within the box. Although illustrated as generally circular in configuration, the box can also be square or rectangular depending on the application. The box is preferably made of plastic from a plastic molding process or a composite material manufactured from a sheet molding process. The grade level box has an open bottom 20 and an open top 22. In use, the grade level box is placed below ground level to contain underground electrical connections such as utility cables or conduits, data transmission lines, service lines, optical fiber cables and other underground utility devices, lines, or cables and the like. These are referred to generally herein as electrical utility connections. The electrical connections go into the hollow interior of the grade level box through the bottom opening of the box. In use, the box is placed in the ground so its top is generally parallel with the ground level. The box is held in position by a stake 24 which is received by a pocket 26 on the outside of the box. The grade level box has a rim 28 spaced below the top opening 22 and the rim extends around the inside walls of the box to support a lid 30.

The lid is mounted to the open top of the box to cover the interior of the box and incorporates a molded in foot 29 and a shielded self-latching locking assembly 31 to secure the lid to the vault. The details of the locking assembly are disclosed in Applicant's U.S. Pat. No. 11,898,375 the contents of which are incorporated herein by reference. The lid encompasses the entire exposed area at the top of the box to protect the interior of the box from the environment. The lid 30 is supported on the rim 28 when the lid is positioned in the top opening of the box.

The vault 12 is convertible to a pedestal by the removal of the lid 30 and insertion of a vault adapter 32 into the top opening 22 and onto rim 28. The adapter replaces the lid and is sized to fit the opening 22. The adapter firmly attaches to the vault by having a plurality of flexible clips 34 extending downwardly around the lower perimeter of the adapter having a detent 36 which when inserted through locating slots 38 in rim 28 the clips flex and the detents then snap back to engage a lower surface of the rim to lock the adapter to the vault. The embodiment shown includes three clips and three slots however any non-symmetrical number would work to secure the adapter to the vault. The adapter protects the underground electrical utility connections when they are brought above ground for connecting to service lines from the customer, for example. The adapter has a sloped wall 40 extending upwardly towards a cylindrical wall portion 42 upon which a pedestal cover 44 is positioned. The adapter has flanges 46 for attachment of an inverted U-shaped metal frame 48 to allow for securing equipment within the adapter and above or below. The adapter also has an angled channel 50 for aligning and connection of the pedestal cover 44. A connector 52 is positioned in the base of the channel which provides a connection ledge for a locking latch 54 positioned on an inside wall of the pedestal cover 44. A sliding access door 56 positioned within a frame 58 is positioned on the sloped wall 40 over an opening 60 in the sloped wall to allow cable to be brought into the enclosure as a temporary solution to adding a new utility line when digging into the ground is not possible or not desired.

A more permanent solution to adding additional new cable to the enclosure would be through sliding access door 62 in vault 12. Door 62 is positioned within a frame 64 and secured over an opening 66 in the wall of the vault. A ramp 68 is formed in the outer wall of the vault which leads towards opening 66 and assists in guiding the new cable into the enclosure. Once inside the vault, an internal chamber passageway or conduit 69 that directs the cable upwardly towards the adapter. The conduit 69 serves to control and organize customer service connections and assist the installer in directing the new cable to where it needs to go. The opening 66 is approximately half-way down the side of the vault and to access the opening digging down into the ground would be required. This is typically done by digging a trench for the new cable. The access door 62 leads to less work to add a new cable as the entire vault does not need to be dug up to add the cable. Both access doors 56 and 62 are fully contained by their frames so they will not fall out or be misplaced.

The vault 12 further includes removable doors 70 on opposite sides of the vault along the bottom which are formed by thinner molded wall sections so that they can be cut out by the installer and are designed to run parallel with the trench in which the enclosure is placed to allow for conduit or other customer requirements to be run directly under the vault. They are designed to be permanently removed when the specific application necessitates. The vault also has slot plugs 72 typically made of rubber which are press fit into the locating slots 38 in rim 28 to fill the slots when the adapter is not in use. The plugs are then removed when installing the adapter in the vault opening.

The pedestal cover 44 is formed by a thin-walled housing structure having a hollow interior 74 with a closed top end 76 and an open bottom that communicates with the interior of the adapter during use. The top end 76 includes a removable identification placard 78 and is configured 80 to provide venting as disclosed in Applicant's U.S. patent application Ser. No. 18/500,837 the contents of which are incorporated herein by reference. The pedestal cover is preferably made of thin molded plastic and, in the illustrated embodiment, is of generally circular cross section although other cross-sectional profiles may be used. The base of the pedestal cover 44 is mounted over the cylindrical wall portion 42 of the adapter and has an opening 80 for receipt of a mechanism 82 to unlock latch 54.

Various mounting devices for making the electrical connections are contained within the vault, adapter and/or the pedestal. These can include a universal mounting plate, fiber splice mounting bars, terminal blocks, support blocks and the like. The universal mounting plate may be rigidly affixed to the inverted U-shaped metal frame 48.

Although the present invention has been described and illustrated herein with respect to one embodiment, however it is to be understood that changes and modifications can be made therein which are within the full intended scope of the invention as hereinafter claimed.

What is claimed is:

1. A utilities enclosure and distribution assembly comprising:
   a grade level vault adapted for installation below ground and having an upper opening facing an interior region for containing at least a below-ground electrical utility cable;
   a removable lid adapted for mounting to the opening in the grade level vault to close off the interior region thereof from the environment; and
   an above grade pedestal housing,
   the pedestal housing comprising a vault adapter configured for replacing the removable lid that removably mounts in the upper opening of the vault for partially closing off the interior region of the vault from the environment, the adapter having an opening to provide access to the interior region of the vault, and
   an elongated cover positioned over the opening in the adapter having a cross-sectional configuration that matches the adapter opening, the adapter and the elongated cover configured for use in receiving electrical connections to a utility cable contained in the grade level vault and brought above-ground level inside the pedestal housing,
   wherein the grade level vault has an opening in a side wall having a slidable door for access to the interior region of the vault.

2. The assembly of claim 1, wherein the grade level vault has a rim adjacent the upper opening, the rim having a plurality of locating slots for adapter interface.

3. The assembly of claim 2, wherein the adapter has a plurality of clips for insertion into the locating slots.

4. The assembly of claim 3, wherein each clip of the plurality of clips has a detent for engaging a lower surface of the rim to lock the adapter to the vault.

5. The assembly of claim 1, wherein the vault has an internal chamber conduit extending upwardly from the opening in the side wall for directing cable upwardly toward the vault adapter.

6. The assembly of claim 1, wherein the vault adapter has a slidable door providing access into the adapter from outside of the adapter.

7. The assembly of claim 6, wherein the vault adapter has a sloped wall portion extending upwardly towards a cylindrical wall portion, the slidable door is located on the sloped wall portion and covers an opening through the sloped wall portion.

8. The assembly of claim 7, wherein the vault adapter includes a channel in the cylindrical wall portion and a connector located in the base of the channel to align and lock the cover to the adapter.

9. The assembly of claim 1, wherein the vault adapter has internal flanges for attachment of a bracket for mounting equipment within the pedestal housing.

10. A utilities enclosure and distribution assembly comprising:
    a grade level box adapted for installation below ground and having an upper opening at ground level facing an interior region for containing a below-ground utility cable;
    an adapter configured for access to the interior region of the grade level box that removably mounts in the upper opening for partially closing off the interior region of the grade level box from the environment, the adapter having an opening to provide access between the inside of the grade level box and an interior region inside the adapter; and
    an elongated cover positioned over the opening in the adapter having a cross-sectional configuration that matches the adapter opening, the adapter and the elongated cover configured for use in receiving electrical connections to a utility cable contained in the grade level box and brought above-ground level to convert the grade level box to a pedestal housing,
    wherein the adapter has a slidable door providing access into the adapter from outside of the adapter.

11. The assembly of claim 10, wherein the grade level box has a rim adjacent the upper opening, the rim having a plurality of locating slots for adapter interface.

12. The assembly of claim 11, wherein the adapter has a plurality of clips for insertion into the locating slots.

13. The assembly of claim 12, wherein each clip of the plurality of clips has a detent for engaging a lower surface of the rim to lock the adapter to the grade level box.

14. The assembly of claim 10, wherein the grade level box has an opening in a side wall having a slidable door for access to the interior region of the grade level box.

15. The assembly of claim 14, wherein the grade level box has an internal chamber conduit extending upwardly from the opening in the side wall for directing cable upwardly towards the adapter.

16. The assembly of claim 10, wherein the adapter has internal flanges for attachment of a bracket for mounting equipment within the pedestal housing.

17. The assembly of claim 10, wherein the adapter has a sloped wall portion extending upwardly towards a cylindrical wall portion, the slidable door is located on the sloped wall portion.

18. The assembly of claim 17, wherein the adapter includes a channel in the cylindrical wall portion and a connector located in the base of the channel to align and lock the cover to the adapter.

19. A utilities enclosure and distribution assembly comprising:
    a grade level box adapted for installation below ground and having an upper opening at ground level facing an interior region for containing a below-ground utility cable;
    an adapter configured for access to the interior region of the grade level box that removably mounts in the upper opening for partially closing off the interior region of the grade level box from the environment, the adapter having an opening to provide access between the inside of the grade level box and an interior region inside the adapter; and an elongated cover positioned over the opening in the adapter having a cross-sectional configuration that matches the adapter opening, the adapter and the elongated cover configured for use in receiving electrical connections to a utility cable contained in the grade level box and brought above-ground level to convert the grade level box to a pedestal housing, wherein the grade level box has an opening in a side wall having a slidable door for access to the interior region of the grade level box.

20. The assembly of claim 19, wherein the adapter has a sloped wall portion extending upwardly towards a cylindrical wall portion.

\* \* \* \* \*